RANDOM ACCESS MAGNETIC DISC FILE ASSEMBLY

Filed Sept. 8, 1964 4 Sheets-Sheet 1

INVENTORS
WILLIAM A. FARRAND
NORMAN E. MARCUM
BY
A. M. Fernandez
ATTORNEY

INVENTORS
WILLIAM A. FARRAND
NORMAN E. MARCUM
BY A. M. Fernandez
ATTORNEY

Dec. 19, 1967 W. A. FARRAND ETAL 3,359,549

RANDOM ACCESS MAGNETIC DISC FILE ASSEMBLY

Filed Sept. 8, 1964 4 Sheets-Sheet 3

INVENTORS
WILLIAM A. FARRAND
NORMAN E. MARCUM

BY A. M. Fernandez

ATTORNEY

RANDOM ACCESS MAGNETIC DISC FILE ASSEMBLY

Filed Sept. 8, 1964 4 Sheets-Sheet 4

INVENTORS
WILLIAM A. FARRAND
NORMAN E. MARCUM
BY
A. M. Fernandez
ATTORNEY

United States Patent Office 3,359,549

Patented Dec. 19, 1967

3,359,549
RANDOM ACCESS MAGNETIC DISC FILE ASSEMBLY

William A. Farrand, Fullerton, and Norman E. Marcum, Laguna Beach, Calif., assignors to North American Aviation, Inc.

Filed Sept. 8, 1964, Ser. No. 394,976
12 Claims. (Cl. 340—174.1)

ABSTRACT OF THE DISCLOSURE

A plurality of annular magnetic discs are radially prestressed and mounted at their periphery within a cylindrical shaft for rotation therewith. A shaft, fixed in position and passing through the center of the annular discs, supports arms which extend out from the shaft and in between the discs. These arms support transducers.

This invention relates to a disc memory, and more particularly memory of the type employing a plurality of magnetic discs mounted for rotation upon a common shaft.

The increase in size and complexity of data processing systems has generated a need for a large reliable and inexpensive random access memory. Magnetic discs are widely used for providing a large random access memory because they require a relatively short access time and their cost is small.

Magnetic disc memories previously available have only been suitable for applications where environmental control is feasible with respect to weather, shock, vibration, etc. A suitable disc file memory uncontrolled environments should embody inherent reliability, long life, ruggedness and environmental tolerance without resorting to extreme measures in design, machining and manufacturing. If sufficient reliability and long life is provided, the complete memory system may be hermetically sealed.

Disc memories available in the past have been inherently reliable and of long life but the ruggedness of such memories and their environmental tolerance has not been suitable for many applications. In practice, magnetic disc memories have been simple both electronically and logically in order to provide inherent reliability and long life. However, ruggedness and environmental tolerance has not been achieved in the past because the discs have been unsupported at the periphery. Discs supported only at the center have a tendency to flutter, and to be deleteriously affected by shock and vibration.

The object of this invention is to provide an improved disc memory.

Another object is to provide a new disc memory which simplifies kinematic problems without any sacrifice in performance.

A further object is to provide a disc memory suitable for uncontrolled environments.

Still another object is to provide a magnetic disc memory which can withstand shock and vibration while in operation.

These and other objects of the invention are achieved by providing annular discs axially stacked along the inside of a cylinder or hollow shaft. The annular discs, cut from large sheets of high quality recording material and pretensioned in the cylinder, are held taut at their periphery. Thus, each taut disc is pretensioned to give an extremely flat and uniform surface even during shock and vibration. Distortion of the recording surface due to temperature changes or ageing stress will not occur because the stress level is always kept positive. That stress level is by design less than the elastic limit of the recording material.

Transducers are positioned by arms extending from a support member passing through centered holes in the discs. There is one arm for each pair of opposing disc surfaces. In a preferred embodiment the transducers are radially positioned by means of a very light linkage. When a given transducer is on a selected track or channel, it is seated on a rigid arm supported by a rigid support member. Thus, when a transducer is on the appropriate track, it is effectively seated on a rigid frame which allows it to be held in positon, even under vibration and shock. The cylinder which supports the discs is impermeable to air. Consequently, the radial air flow along the disc surface is attenuated. In that manner, the hydrodynamically supported transducer is maintained at a more invariant distance from the disc surface regardless of its radial positon.

Other objects and advantages of the invention may be more fully understood from the following description with reference to the drawings in which.

Figure 1:
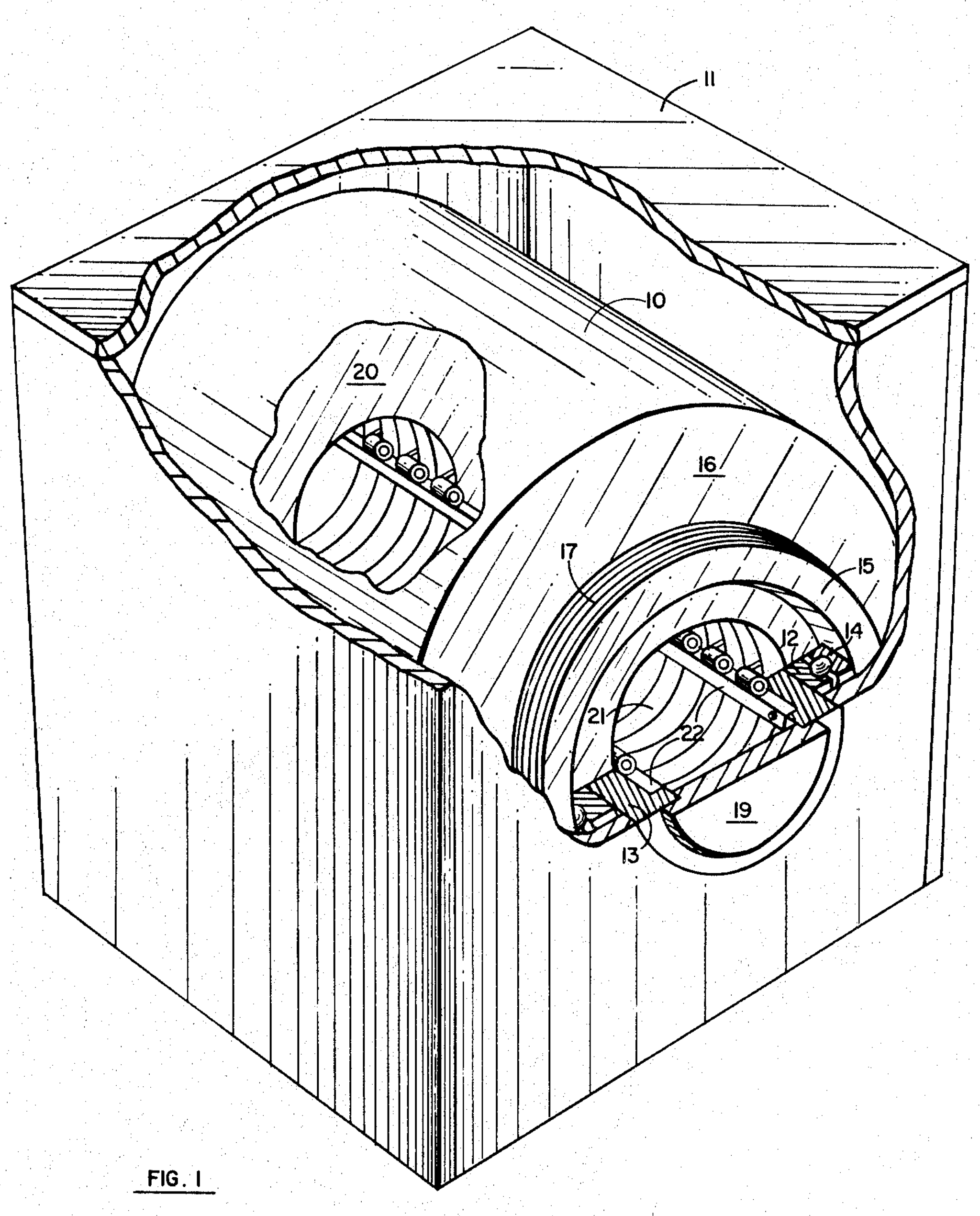
FIGURE 1 is a perspective view of the invention partially broken away.

Referring to FIGURE 1, the major elements of a preferred embodiment of the invention include a cylinder or hollow shaft 10 supported at each end in a closed stationary member 11 by a ball bearing having an inner race member 12 fixedly attached to an annular sleeve 13 and an outer race member 14 fixedly attached to an annular flange 15 protruding from an end wall 16 of cylinder 10.

Figure 2:
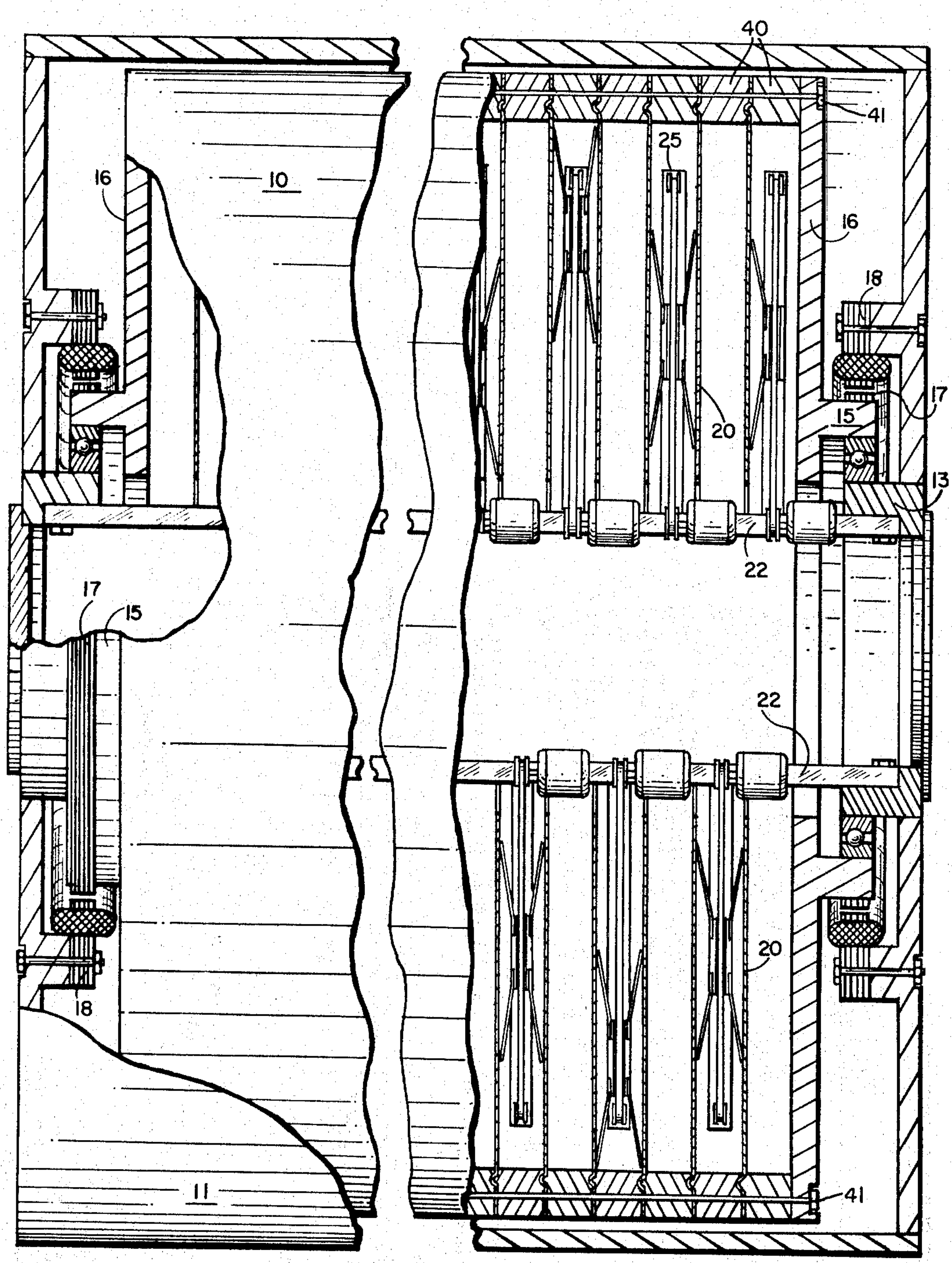
FIGURE 2 is a plan view of the invention partially broken away and partially cross-sectioned.

A rotor 17 of a synchronous motor is attached to the outside of the annular flange 15 at each end of the cylinder as more clearly shown in FIGURE 2. The stator 18 of the synchronous motor is attached to supporting member 11. In that manner, cylinder 10 may be continuously rotated by synchronous motors at both ends to provide sufficient power to rotate as many discs 20 as required.

As just noted each disc 20 is supported at the periphery and is provided with a hole at the center, as may be more clearly seen in FIGURE 1. Since the holes of discs 20 are centered, and annular flange 15 is centered on end wall 16 of cylinder 10, access to each disc 20 may be gained through annular sleeve 13 journaled to flange 15. A concentric hole 21 is provided for that purpose through end wall 16 of rotatable cylinder 10.

Figures 3, 3A:
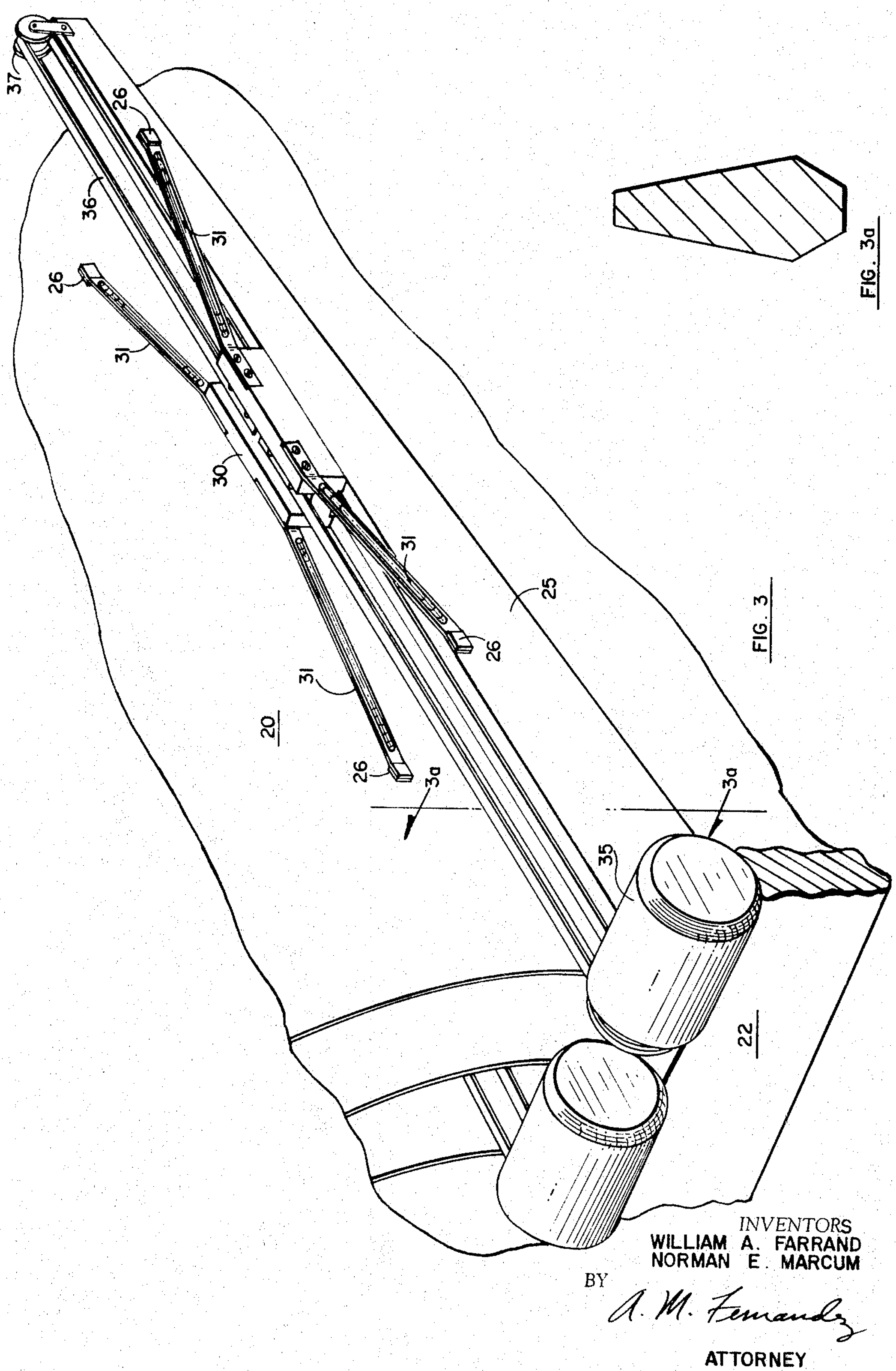
FIGURE 3 is a perspective view of a transducer supporting and positioning assembly and FIGURE 3*a* is a cross-section of a preferred configuration of a supporting arm.

Two or more bars 22 passing through the centered holes of the discs are provided as support means for arms 25 which support magnetic heads 26 more clearly shown in FIGURE 3. In the illustrated embodiment, two bars 22 are provided in order to support arms 25 on alternate sides in the successive spaces between discs 20 as shown in FIGURE 2. However, more support bars may be provided for the purpose of supporting two or more arms 25 in the same space between a pair of discs if access to a given channel is desired from more than one station.

Arm 25 shown in FIGURE 3 is preferably so shaped as to provide stabilizing hydrodynamic forces which prevent flutter of the arms, such as in the shape indicated by a cross-section in FIGURE 3*a* for the arm along the line *a—a* of FIGURE 3. However, for simplicity in the drawings, arms 25 have not been so shaped in FIGURES 2, 3 and 4.

Heads 26 are radially positioned close to recording surfaces on discs 20 by a movable head carriage assembly comprising a block 30 to which heads 26 are attached by prong-like members 31 made of thin flexible material cross-curved except at the ends to confine all bending action at the ends. Heads 26 are preferably so shaped as to provide aerodynamic forces for maintaining a constant head-to-disc gap. However, other known techniques for maintaining a gap may be employed none of which need be described here since head positioning and spacing is not a part of this invention.

Figure 4:
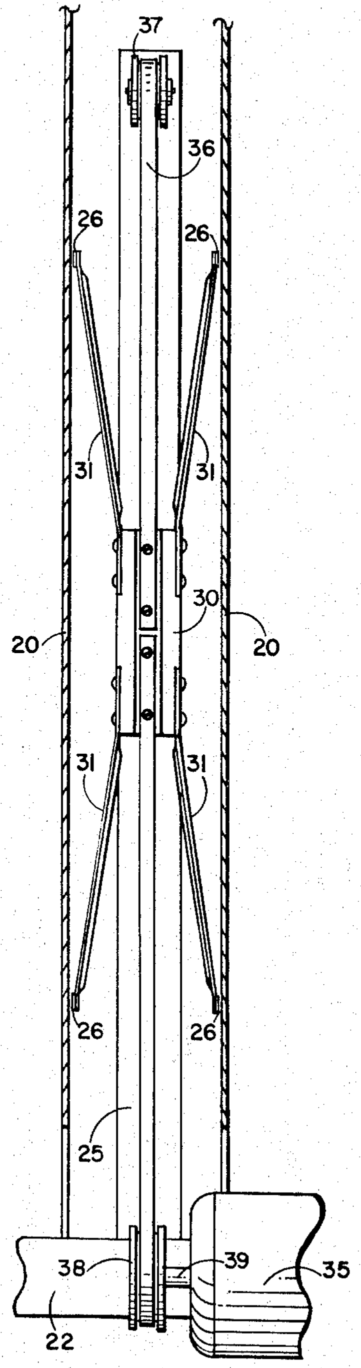
FIGURE 4 is a plan view of the transducer supporting and positioning assembly of FIGURE 3.

As just noted, a particular means for positioning the heads is not essential to the practice of this invention; fixed heads may be employed instead. However, the illustrated embodiment, block 30 supports two heads 26 for a disc 20 on each side of it. A motor 35 secured to support bar 22 is employed to position block 30 through a belt 36 and a pulley 37 as shown in FIGURE 3. A driven pulley 38 keyed to a drive shaft 39 of motor 35 is shown in FIGURE 4.

Prong-like members 31 hold the pair of heads 26 associated with a given disc 20 on one side of arm 25 at a radial distance from block 30 so selected that one head 26 may be radially positioned to scan all tracks or channels of recorded information on the outer half of the recording surface of disc 20 while the other head 26 may be radially positioned to scan all tracks on the inner half of disc 20. Pneumatic, electric, or mechanical means contained within arm 25 may be employed to securely clamp block 30 to arm 25 when in proper radial position to read from or store in a selected track, thereby further improving the system's ability to withstand shock and vibration while in operation.

However, as just noted, an alternative system for addressing memory tracks may employ fixed heads on arm 25.

Referring back to FIGURES 1 and 2 wherein the essence of the invention is illustrated, it may be seen that an everted magnetic disc memory is provided in which the shaft comprised of cylinder 10 shrouds discs 20. Cylinder 10 is in turn enclosed by stationary supporting member 11. When the opening through sleeve 13 at each end is closed by a cover plate 19, an air tight, dust free magnetic disc memory is provided.

As noted hereinbefore, discs 20 are held taut at their periphery, with holes in their centers large enough to insert support members 22 and arms 25, and secure them in place.

Discs 20 are formed of large sheets of high quality recording material (e.g. thin metal or plastic suitably coated with magnetic recording material). Since discs 20 are supported at their periphery, they may be made much thinner than discs supported by a shaft in the center. In order to provide extremely flat and uniform surfaces, discs 20 are pretensioned to a point less than the elastic limit of the base material employed. The hole at the center of each disc 20 is preferably cut after the desired radial tension has been provided. Thereafter the lines of tension are tangent to the hole. However, for the purposes of this invention, stressed annular disc is said to be radially tensioned. With such positive stress on discs 20, no distortion of the recording surface from thermal or aging stresses will occur. The assembly of taut discs 20 and arms 25 for heads 26 is extremely rugged.

The hydrodynamic forces which the autolubricating boundary layer of a rotating disc produces holds the pair of heads 26 away from the surface of disc 20 against the aerodynamic forces produced by heads 26. The relationship of these two forces maintains the proper space between heads 26 and taut disc 20 so that head 26 follows disc 20 undulations faithfully. With taut discs 20 of the present invention, undulations caused by shock and vibration are virtually eliminated.

Discs 20 may be pretensioned by stretching the sheet material while assembling cylinder 10 from a plurality of rings 40 fastened together by bolts 41 shown in FIGURE 2. A ridge on one ring may be provided to fit into a corresponding groove in the adjacent ring to assure that after the rings have been tightly fastened together by the bolts, and the external tensioning means (not shown) removed, the pretension of the discs thus produced is maintained as a positive stress. The excess disc material outside the loops to which the tension means is attached is then removed. To reduce drag the assembled cylinder may be coated with a smooth film of material such as plastic or otherwise finished to a smooth surface. Other methods of assembling the cylinder with pretensioned discs may, of course, be employed. For example, by attaching discs 20 to separate rings independent of the means for stacking and/or attaching the rings to cylinder 10, replacement of one or more discs 20 may be made without disturbing the tension in the others.

Although this invention has been illustrated in one embodiment as comprising a magnetic disc file memory for data processing applications, it should be understood that other embodiments for other applications may be advantageously provided, such as jukeboxes for phonograph records, without departing from the principles described and claimed herein. The appended claims are therefore intended to cover and embrace any such modifications, within the limits only of the true spirit and scope of the invention.

What is claimed is:

1. A record disc comprising
a radially pre-tensioned annular disc held taut at its periphery to form a flat pre-stressed record surface,
means passing through the center of said annular disc for supporting at least one transducer close to said record surface, including means for varying the position of said transducer radially along said surface,
and means for rotating said disc.

2. A record disc file comprising
a plurality of radially pre-tensioned annular discs in an axially spaced apart relationship for rotation upon a common axis, said discs held taut at their peripheries,
means passing through the centered holes of said discs for supporting transducers positioned close to record surfaces on said discs, said discs being supported for rotation relative to said transducer supporting means, and
means for rotating said discs.

3. A record disc file comprising
a plurality of annular discs axially stacked and stress mounted in a cylinder for rotation upon a common axis, each disc having a centered hole and a record on at least one surface,
means passing through said centered holes of said discs for supporting transducers close to said record surfaces on said discs,
and means for rotating said cylinder.

4. An everted magnetic disc memory comprising
a hollow drive shaft,
a plurality of stacked annular discs axially spaced along and within said hollow drive shaft, each disc being held taut at its periphery,
means passing through the centered holes of said discs for supporting transducers close to the recording surfaces on said discs,
and means for rotating said drive shaft.

5. A magnetic memory comprising
a plurality of magnetic discs stress mounted in a cylinder for rotation upon a common axis, each disc having a centered hole and concentric recording channels about said hole on at least one surface,
means passing through said centered holes of said discs supporting transducers close to said recording surfaces on said discs,
and means for rotating said cylinder.

6. A magnetic disc memory comprising
a plurality of magnetic discs, each held taut at its periphery, each disc having a centered hole and concentric record channels about said hole on at least one surface,
means passing through said centered holes of said discs for supporting transducers close to said recording surfaces on said discs,
and means for rotating said discs.

7. A magnetic disc memory comprising
a plurality of magnetic discs stress mounted in a cylinder for rotation upon a common axis, each disc having a centered hole and concentric recording channels about said hole on at least one surface,
means for rotating said cylinder to rotate said discs,
at least one transducer associated with each disc for recording and reproducing data on said channels,
and means passing through said centered holes of said discs for supporting said transducers, each in a position close to the surface of its associated disc.

8. A magnetic disc memory comprising
a plurality of radially pre-tensioned annular discs in an axially spaced apart relationship for rotation upon a common axis, each disc having magnetic retentive material on at least one recording surface,
means passing through the centered holes of said discs for supporting transducers close to said recording surfaces, said discs being supported for rotation relative to said transducer supporting means,
a rotatable shroud enclosing said axially spaced apart discs,
and bearing means for supporting said discs in said shroud in an axially rotatable relationship.

9. A magnetic disc memory comprising
a plurality of magnetic discs mounted for rotation within a common shaft, each disc being pretensioned and having a centered hole,
means for rotating said shaft,
at least one transducer associated with at least one recording surface of each disc and an arm for supporting said transducer close to the recording surface of its associated disc,
means passing through the centered holes of said discs for supporting each arm,
and means for rotating said shaft.

10. A recording disc file comprising,
a plurality of annular discs axially stacked and mounted for rotation about a common axis, each of said discs being radially pretensioned, at least one of said discs being replaceable by another radially pretensioned disc,
transducer means suspended from a position centrally located with respect to said discs, and
means for rotating said discs.

11. The combination as recited in claim 10, wherein said means for rotating comprises a driveshaft connected about the periphery of said discs and means for rotating said driveshaft.

12. The combination as recited in claim 10, wherein the position of said transducer means is radially variable with respect to said discs.

References Cited

UNITED STATES PATENTS

| | | | |
|---|---|---|---|
| 3,336,583 | 8/1967 | Comstock | 179—100.2 |
| 3,334,193 | 8/1967 | Dow | 179—100.2 |
| 3,229,269 | 1/1966 | Namenyi-Katz | 340—174.1 |
| 3,209,079 | 9/1965 | Skalwold | 179—100.2 |
| 2,800,642 | 7/1957 | May | 340—172.1 |

FOREIGN PATENTS

| | | |
|---|---|---|
| 942,127 | 11/1963 | Great Britain. |

BERNARD KONICK, *Primary Examiner.*

A. I. NEUSTADT, *Assistant Examiner.*